United States Patent
Belfatto, Sr. et al.

(10) Patent No.: US 6,246,565 B1
(45) Date of Patent: Jun. 12, 2001

(54) DOUBLE SOLENOID LINEAR MOTION ACTUATOR

(75) Inventors: Robert V. Belfatto, Sr., Melbourne Beach; Eddie H. Young, Melbourne, both of FL (US); Faramarz Frank Ghassemi, San Jose, CA (US)

(73) Assignee: Neos Technologies, Inc., Melbourne, FL (US)

( * ) Notice: Subject to any disclaimer, the term of this patent is extended or adjusted under 35 U.S.C. 154(b) by 0 days.

(21) Appl. No.: 09/631,465

(22) Filed: Aug. 3, 2000

Related U.S. Application Data

(60) Provisional application No. 60/159,405, filed on Oct. 14, 1999.

(51) Int. Cl.[7] ................................................ H01H 47/00
(52) U.S. Cl. ........................................ 361/168.1; 385/18
(58) Field of Search ................................. 361/153–156, 361/167, 168.1, 189, 190, 191, 166; 307/10.1, 44; 359/127, 129, 132, 139, 193, 196, 197, 198, 223, 224, 298; 385/47, 18

(56) References Cited

U.S. PATENT DOCUMENTS

| 4,790,621 | 12/1988 | Calaby et al. ................. 350/96.2 |
|---|---|---|
| 5,099,384 * | 3/1992 | Chin ................................ 361/166 |
| 5,490,534 | 2/1996 | Van Rens .......................... 137/1 |
| 5,711,347 | 1/1998 | Sturman et al. ............. 137/625.65 |
| 5,903,687 * | 5/1999 | Young et al. ..................... 385/18 |
| 5,959,756 | 9/1999 | Keyworth et al. ............... 359/196 |

\* cited by examiner

Primary Examiner—Ronald W. Leja
(74) Attorney, Agent, or Firm—Allen, Dyer, Doppelt Milbrath & Gilchrist, P.A.

(57) ABSTRACT

A dual solenoid-based linear motion actuator has a single input for supplying both electrical power and positioning signals for a pair of solenoid coils. A binary control signal alternates between first and second voltage levels, one of which is used for powering the dual solenoid actuator and its control electronics, and also for controllably displacing a movable element to a first of a pair of spaced apart positions terminated by electrically conductive stops. The moveable element is electrically coupled to the second voltage level so that contact with either of the stops will apply the second electrical voltage level to control logic circuitry. The actuator's input terminal is coupled to an electrical energy storage circuit, such as a battery and/or capacitor in parallel with the battery, that serves as the power supply for the actuator, extracting and storing power necessary for operating the control circuitry and energizing the solenoid coils.

14 Claims, 2 Drawing Sheets

DOUBLE SOLENOID LINEAR MOTION ACTUATOR

CROSS-REFERENCE TO RELATED APPLICATION

The present application claims the benefit of co-pending U.S. Provisional Patent Application, Ser. No. 60/159,405, filed Oct. 14, 1999.

FIELD OF THE INVENTION

The present invention relates in general to object-positioning devices, such as those employed for controllably positioning light beam deflectors with respect to light beam paths of a fiber optic communication system, and is particularly directed to a dual solenoid-based linear motion actuator, that is configured to require no more than a single electrical input for supplying both electrical power and positioning signals for operating the actuator.

FIELD OF THE INVENTION

Accompanying the very rapid expansion of the telecommunication industry has been the increasing use of optical subsystems and components therefor including, but not limited to fiber optic devices that provide substantially increased bandwidth capabilities in comparison with conventional metallic (copper) wire systems. In optical systems, switching of light signal paths is customarily accomplished by physically displacing some form of light beam deflector, such as a mirror, relative to a light beam path of interest. As a result, a fiber optic-based telecommunication switch, such as may be employed in a multi-network telecommunication system handling tens of thousands of signal transport paths, can be a very hardware intensive piece of equipment.

This hardware complexity is not only associated with the relatively large physical installation volume occupied by the switch per se, but is due to the connectivity complexity that is associated with the very large number of wires required to operate all of the optical cross-points. In addition, conventional solenoid-based optical switches customarily require that power be applied continuously, in order to maintain a mirror actuator in position against the mechanical action of a spring.

SUMMARY OF THE INVENTION

In accordance with the present invention, these shortcomings of conventional light beam switching systems are effectively obviated by a dual solenoid-based linear motion actuator, that is configured to require no more than a single input for supplying both electrical power and positioning signals for operating the actuator. A non-limiting example of an optical system environment in which the dual solenoid-based linear motion actuator of the present invention may be employed is detailed in the U.S. Patent to Young et al. U.S. Pat. No. 5,903,687, issued May 11, 1999, and the disclosure of which is incorporated herein.

As will be described, the dual solenoid-based linear motion actuator of the present invention employs a binary control signal that alternates between respective first and second voltage levels, one of which (e.g., some voltage differential (+/−V) relative to ground (GND)) is used for powering the dual solenoid actuator and its control electronics, and for controllably displacing a movable element to a first actuator position. The moveable element may be arranged to displace a light beam deflector such as a mirror, and the like and is magnetically coupled with a pair of solenoid coils of a dual coil arrangement and is translatable between a first position terminated by a first stop and a second position terminated by a second stop. The moveable element is electrically coupled to the second voltage level (GND), and is arranged to cause the second electrical voltage level to be applied to control logic circuitry, in response to coming in contact with either of the stops.

The actuator's input terminal is coupled to an electrical energy storage circuit, such as a battery and/or capacitor in parallel with the battery, that serves as the power supply for the actuator, extracting and storing power necessary for operating the control circuitry and energizing the solenoid coils. The actuator's input terminal is further coupled to the control circuit, which includes a comparator section and a switch control section. The comparator section includes a pair of complementary referenced threshold comparators, whose outputs are used to control logic circuits and driver circuits for respective solenoid coils.

The duty cycle of the control signal is such that the duration of its electrical state associated with the power supply voltage level is longer than the duration required to sufficiently energize an actuator coil to fully translate the movable shaft from one position to another. The remaining portion of the duration of the first electrical state is used to charge the energy storage element(s) of the electrical energy storage device, and replenish charge that was used to previously translate the movable element.

DETAILED DESCRIPTION

Figure 1:
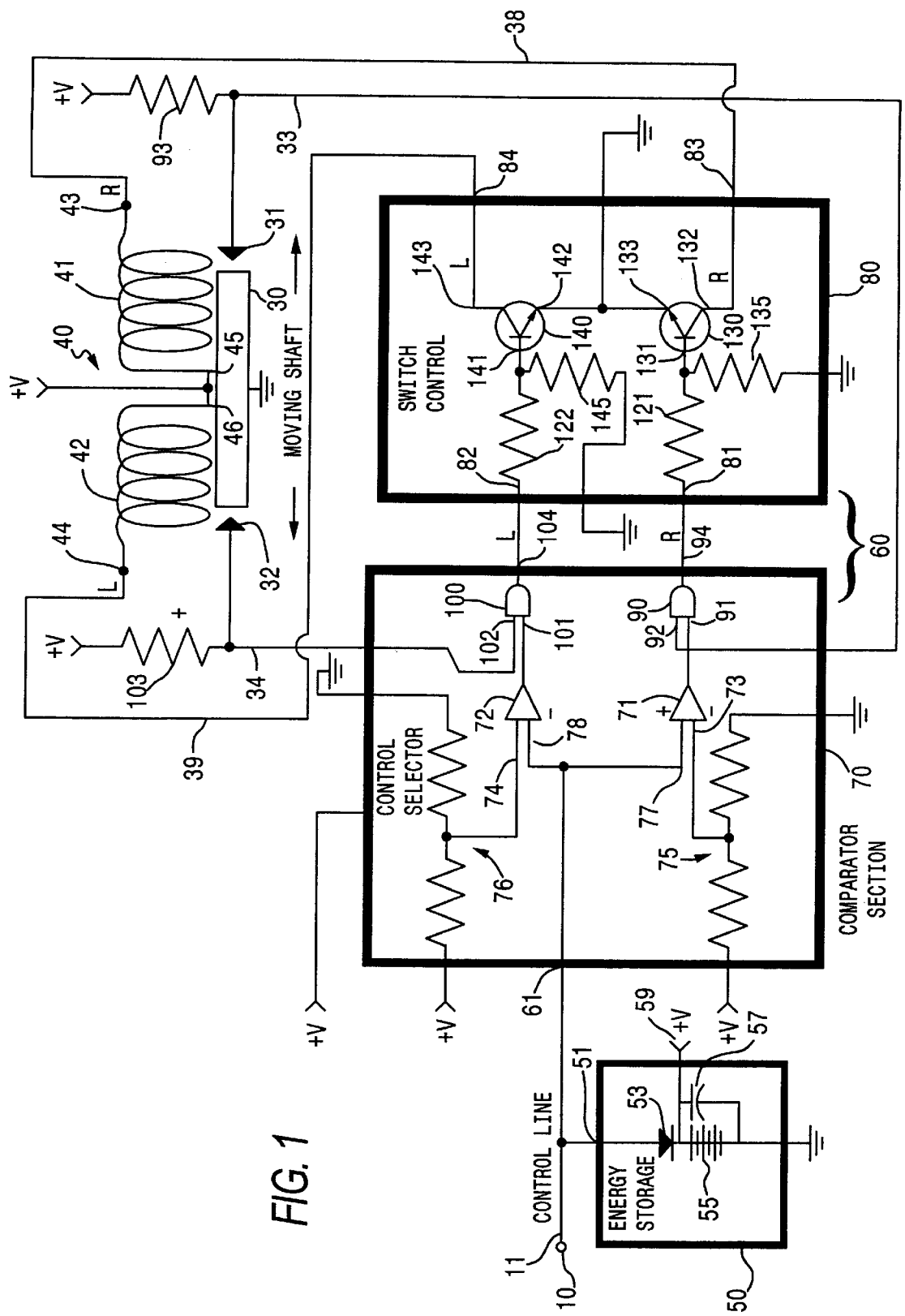
FIG. 1 schematically illustrates an embodiment of a dual solenoid-based linear motion actuator of the present invention.

The dual solenoid-based linear motion actuator of the present invention is schematically illustrated in FIG. 1 as comprising an input terminal 10 that is adapted to be connected to a single control line 11 to which a control signal is applied. As will be described below and as is shown in the timing diagram of FIG. 3, the control signal on line 11 is a binary signal that alternates between respective first (high) and second (low) electrical states 21 and 22 (e.g., voltage levels, shown as +V and ground (GND), as non-limiting examples). In the present example, the first electrical state 21 is a first voltage level +V that is used for powering the dual solenoid actuator, on the one hand, and is also associated with a first translation position of a controllably displaced element, such as a rightward most position of a movable shaft 30. The second electrical state 22 of the control signal is a second voltage level (GND in the present example) associated with the second, leftward most position of the movable shaft 30.

Figure 2:
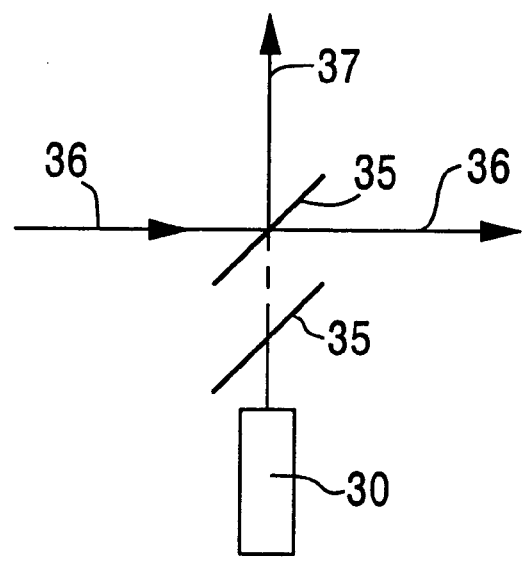
FIG. 2 diagrammatically illustrates a light beam deflector that may be controllably positioned by the dual solenoid-based linear motion actuator of the present invention.

As pointed out above, and as diagrammatically illustrated in FIG. 2, the movable shaft 30 may be coupled to a controllably positionable light beam deflector, such as a mirror 35, that is arranged to controllably positioned (e.g., translated or pivotally rotated) into and out of a light beam path 36, so as to controllably allow a light beam incident along path 36 to continue along path 36 or deflected along a different path 37. As noted earlier, the optical switching system detailed in the U.S. Patent to Young et al. U.S. Pat. No. 5,903,687, issued May 11, 1999 is a non-limiting example of an environment in which the dual solenoid actuator mechanism of the present invention may be employed.

The movable shaft 30 preferably contains conductive material and is magnetically coupled with a pair of solenoid coils 41 and 42 of a dual coil arrangement 40. The moveable shaft 30 is arranged to be translatable between a first, rightward most position, defined by a first stop 31, and a second or leftward most position defined by a second stop 32. In addition to being magnetically coupled to the coils 41 and 42, the moveable shaft 30 is electrically coupled to the second voltage level (GND).

In the illustrated embodiment, each of the stops 31 and 32, like the moveable shaft 30, may be made of electrically conductive material or may include an electrically conductive region that is arranged to be contacted by the electrically conductive moveable shaft 30 when the shaft is translated by a respective solenoid to a stop position. Since moveable shaft 30 is electrically coupled to the second voltage level (GND), contact with either of the stops 31 and 32 will cause the second electrical voltage level (GND) to be applied through an associated conductive lead to one of a pair of AND gates 90 and 100.

The actuator's input terminal 10 is coupled to an input port 51 of an electrical energy storage circuit 50. The electrical energy storage circuit 50 serves as the power supply for the actuator and is configured to store and supply power necessary for operating the control circuitry and controllably actuating each of the solenoid coils 41 and 42. The storage circuit's input port 51 is coupled through a diode 53 to an electrical energy storage device, such as a battery 55 and/or capacitor 57 coupled in parallel with the battery 55, and being terminated at a ground terminal 58. The energy storage circuit 50 has an output terminal 59 coupled to the energy storage device (s), from which an output voltage (+V) for supplying the operating voltage for a control circuit 60 and for powering the actuator coils of the solenoid actuator arrangement 40 is derived.

The actuator's input terminal 10 is further coupled to an input port 61 of the control circuit 60, which includes a comparator section 70 and a switch control section 80. The comparator section 70 includes a first comparator 71 having a negative input terminal 73 referenced to the (+V) supply voltage through a ground-terminated voltage divider 75, and a positive input terminal 77 coupled to the input terminal 10. In a complementary manner, the second comparator 72 has its positive input terminal 74 referenced to the (+V) supply voltage through a ground-terminated voltage divider 76 and its negative input terminal 78 coupled to the input terminal 10.

The output of the first comparator 71 is coupled to a first input 91 of an AND gate 90, a second input 92 of which is coupled over line 33 to the rightward most electrically conductive stop 31 and through a resistor 93 to the +V power supply voltage. The output 94 of the AND gate 90 is coupled to a first input terminal 81 of the switch control section 80. The output of the second comparator 72 is coupled to a first input 101 of an AND gate 100, a second input 102 of which is coupled over line 34 to leftward most electrically conductive stop 32 and through a resistor 103 to the +V power supply voltage. The output 104 of the AND gate 100 is coupled to a second input terminal 82 of switch control section 80.

The first input 81 of the switch control section 80 is coupled through a coupling resistor 121 to the base 131 of a first switching transistor 130, shown as an NPN bipolar transistor in the present example. Base bias for transistor 130 is coupled through a resistor 135 to ground. Transistor 130 has its emitter 132 coupled to ground (GND) and its collector 133 coupled to a first output terminal 83. The second input 82 of the switch control section 80 is coupled through a coupling resistor 122 to the base 141 of a second (NPN) switching transistor 140. Base bias for transistor 140 is coupled through a resistor 145 to ground. Transistor 140 has its emitter 142 coupled to ground (GND) and its collector 143 coupled to a second output terminal 84.

The first output terminal 83 of the switch control section 80 is coupled over line 38 to a first terminal 43 of the (rightward direction) solenoid coil 41, a second terminal 45 of which is coupled over line 39 to receive the (+V) voltage supplied by the output port 59 of the energy storage circuit 50. The second output terminal 84 of the switch control section 80 is coupled to a first terminal 44 of the (leftward direction) solenoid coil 42, a second terminal 46 of which is coupled to receive the (+V) voltage supplied by the output port 59 of the energy storage circuit 50.

Figure 3:
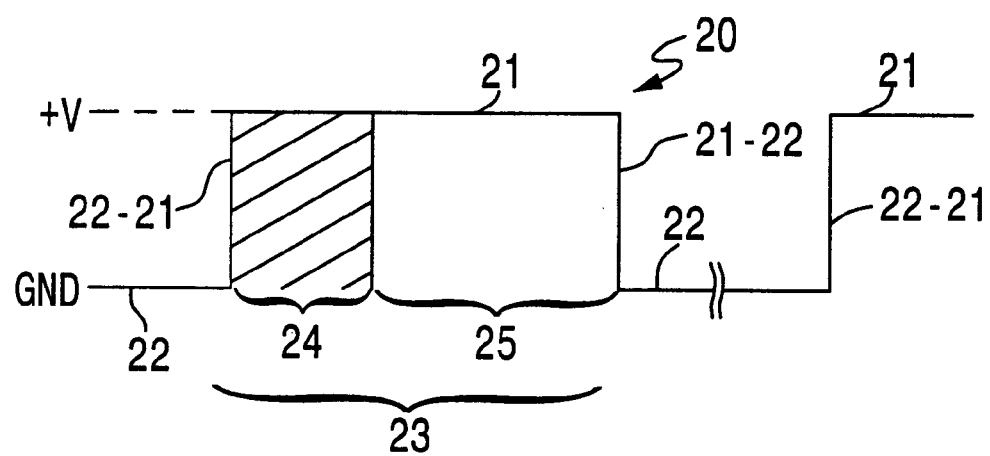
FIG. 3 is timing diagram associated with the operation of the dual solenoid-based linear motion actuator of FIG. 1.

As pointed out above, and as shown in the timing diagram of FIG. 3, the duty cycle of the control signal supplied over the control line 11 is such that the duration 23 of its first electrical state 21, associated with the first (power supply) voltage level (+V), is longer than the duration 24 required to sufficiently energize the actuator coil 41 to fully translate the movable shaft 30 from its (leftward most) position into contact with rightward most electrically conductive stop 31. The remaining portion 25 of the duration 23 of the first (+V) electrical state 21 is used to charge the energy storage element(s) (battery 55 and/or capacitor 57) of the electrical energy storage device 50. In addition, the duration of this remaining portion 25 of the first electrical state 21 is sufficient to replenish charge that was used to previously translate the movable shaft 30 into contact with leftward most stop 32.

In operation, it will be initially assumed that the movable shaft 30 is positioned against its leftward most stop 32, with the control signal 20 on the input line 11 at its second electrical state (GND) 22. As shown in the timing diagram of FIG. 3, in order to effect a rightward translation of the movable shaft, the control signal 20 undergoes a transition 22-21 from its second (low) electrical state (GND) 22 to its first (high) electrical state (+V) 21. In response to this high electrical state, the output of comparator 71 goes high, while the output of comparator 72 goes low.

With the output of comparator 71 going high, the first input 91 of AND gate 90 goes high. Since the second input 92 of AND gate 90 is also high (being coupled through resistor 93 to the +V power supply voltage), the output 94 of AND gate 90 goes high, turning on transistor 130 within switch control section 80. At the same time, with the output of the other comparator 72 going low, the first input 101 of AND gate 100 goes low, so that the output 1094 of AND gate 100 is low, keeping transistor 140 within the switch control section 80 turned off. Since transistor 140 is turned off, there is no current flow path therethrough to ground, so that the (leftward direction) solenoid coil 42 remains unenergized.

When the output of comparator 71 goes high, the first input 91 of AND gate 90 goes high, so that the output 94 of AND gate 90 is high, turning on transistor 130 within the switch control section 80. Since transistor 130 is turned on, the first output terminal 83 of the switch control section 80 applies approximately ground level potential to the first terminal 43 of the (rightward direction) solenoid coil 41. Since the second terminal 45 of coil 41 is coupled to the +V voltage supplied by the output port 59 of the energy storage circuit 50, energizing current now flows through the coil 41, so as to translate the movable shaft 30 toward the rightward most stop 31.

When the shaft 30 contacts the stop 31 (which, as pointed out above, occurs at a time prior to the termination of the duration 23 of its first electrical state 21), ground potential is applied thereby to the second input 92 of the AND gate 90, so that the output 94 of the AND gate 90 goes low. Since the output of AND gate 90 is low, transistor 130 within the switch control section 80 turns off, the terminating the flow of energizing current through the rightward direction coil 41. During the remaining portion 25 of the duration 23 of the first electrical state 21 of the control signal, the first (power supply) voltage level (+V) of the control signal is used to charge the energy storage element(s) (battery 55 and/or capacitor 57) of the electrical energy storage device 50.

In order to effect a leftward translation of the movable shaft, the control signal 20 next undergoes a transition 21-22 from its first (high) electrical state (+V) 21 to its second (low) electrical state (GND) 22. In response to this low electrical state, the output of comparator 71 goes low, while the output of comparator 72 goes high. With the output of comparator 72 going high, the first input 101 of AND gate 100 goes high. Since the second input 102 of AND gate 100 is also high (being coupled through resistor 103 to the +V power supply voltage), the output 104 of AND gate 100 goes high, turning on transistor 140 within switch control section 80. At the same time, with the output of the comparator 71 going low, the first input 91 of AND gate 90 goes low, so that the output 94 of AND gate 90 is low, keeping transistor 130 within the switch control section 80 turned off. Since transistor 130 is turned off, there is no current flow path therethrough to ground, so that the (rightward direction) solenoid coil 41 remains unenergized.

As the output of comparator 72 goes high, the first input 101 of AND gate 100 goes high, so that the output 104 of AND gate 100 is high, turning on transistor 140 within the switch control section 80. This causes the first output terminal 83 of the switch control section 80 to apply approximately ground level potential to the first terminal 44 of the (leftward direction) solenoid coil 42. Since the second terminal 46 of coil 42 is coupled to the +V voltage supplied by energy storage circuit 50, energizing current now flows through the coil 42, translating the movable shaft 30 away from its rightward most stop 31 and into contact with its leftward most stop 32.

In response to the shaft 30 contacting stop 32, ground potential is applied thereby to the second input 102 of the AND gate 100, so that the output 104 of the AND gate 100 goes low. Since the output of AND gate 100 is low, the transistor 140 within the switch control section 80 turns off, terminating the flow of energizing current through the leftward direction coil 42. During the remainder of the second electrical state 22 of the control signal 20 (namely, until the next low-to-high level transition in the control signal), the movable shaft remains in its leftward most position, whereupon a rightward translation of the movable shaft is effected as described above.

Although, during the remaining portion of the second electrical state 22 of the control signal, no power is required for operating either of the coils 41 and 42, it is still necessary to bias and maintain the operational state of the control electronics. However, the power consumed for this purpose is extremely low, and is sufficiently replenished during the recharging portion 25 of the duration of the first electrical state 21 of the control signal used to translate the shaft in the other (rightward) direction, as described above.

As will be appreciated from the foregoing description, the above described shortcomings of conventional light beam switching systems are effectively obviated by the dual solenoid-based linear motion actuator of the present invention, which requires no more than a single input for supplying both electrical power and positioning signals for operating the actuator. The duty cycle of the binary control signal is such that its duration associated with the power supply voltage level is longer than the duration required to sufficiently energize an actuator coil to fully translate the movable shaft from one position to another. The remaining portion of the duration of that electrical state of the control signal is used to charge the energy storage element(s) of the electrical energy storage device, and replenish charge that was used to previously translate the movable element.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An apparatus for controllably moving an object between first and second locations comprising:
   a single input terminal adapted to receive a control signal that alternates between a first electrical state associated with said first location of said object, and a second electrical state associated with said second location of said object;
   a first electrically controlled positioner, coupled with said object and being operative, in response to a first electrical stimulus applied thereto, to move said object from said second location to said first location;
   a second electrically controlled positioner, coupled with said object and being operative, in response to a second electrical stimulus applied thereto, to move said object from said first location to said second location;
   a control circuit coupled to receive said control signal, and electrical energy for operating said first and second electrically controlled positioners, and having a first output from which said first electrical stimulus is applied to said first electrically controlled positioner, and a second output from which said second electrical stimulus is applied to said second electrically controlled positioner; and
   an electrical energy storage device coupled to said single input terminal and being operative to store said electrical energy from said first electrical state of said control signal.

2. An apparatus according to claim 1, wherein said electrical energy storage device includes a battery.

3. An apparatus according to claim 1, wherein said electrical energy storage device includes a capacitor.

4. An apparatus according to claim 1, wherein said first and second electrically controlled positioners comprise respective first and second solenoid coils, and said object comprises a movable shaft that is translatable by said first and second solenoid coils between said first and second locations.

5. An apparatus according to claim 4, wherein said movable shaft is coupled to a light beam deflector that is controllably positionable into and out of a light beam path between first and second optical fibers.

6. An apparatus for controllably moving a light beam deflector supported by a translatable element for movement with respect to a light beam path comprising:

an input terminal adapted to receive a control signal that alternates between a first electrical state associated with a first position of said light beam deflector and a second electrical state associated with a second position of said light beam deflector;

a first solenoid coil, coupled with said translatable element and being operative, in response to a first electrical stimulus applied thereto, to move said translatable element from a first location associated with said first position of said light beam deflector to a second location associated with said second position of said light beam deflector;

a second solenoid coil, coupled with said translatable element and being operative, in response to a second electrical stimulus applied thereto, to move said translatable element from said second location to said first location;

a control circuit having a first input coupled to receive said control signal, a second input coupled to receive electrical energy for operating said first and second solenoid coils, a first output for supplying said first electrical stimulus to said first solenoid coil, and a second output for supplying said second electrical stimulus to said second solenoid coil; and an electrical energy storage device coupled to said input terminal and to said second input of said control circuit, and being operative to extract and store said electrical energy from said first electrical state of said control signal.

7. An apparatus according to claim 6, wherein said electrical energy storage device includes a battery.

8. An apparatus according to claim 6, wherein said electrical energy storage device includes a capacitor.

9. An apparatus comprising:

a moveable shaft arranged to displace an element between first and second positions thereof;

a dual coil actuator comprising first and second solenoid coils arranged to be magnetically coupled with said moveable shaft and to controllably move said moveable shaft between a first position and a second position: and a driver circuit coupled to said first and second solenoid coils of said dual coil actuator and having a single input port coupled to receive a single control signal that alternates between respective first and second voltage levels, one of which powers said dual solenoid actuator and is associated with a first controlled displacement of said moveable shaft to said first position, and a second of which is associated with a second controlled displacement of said moveable shaft to said second position.

10. An apparatus according to claim 9, wherein said element is adapted to deflect a light beam along respectively different optical paths associated with said first and second positions of said moveable shaft.

11. An apparatus according to claim 9, further including first and second stops associated with said first and second positions, and wherein said moveable shaft is arranged to cause said second voltage level to be applied to said driver circuit in response to coming in contact with either of said stops.

12. An apparatus according to claim 9, further including an electrical energy storage device coupled to said single input port and being operative to extract and store electrical energy from said first voltage level of said control signal.

13. An apparatus according to claim 12, wherein said driver circuit includes complementary referenced threshold comparators, outputs of which control operation of said first and second solenoid coils.

14. An apparatus according to claim 13, wherein said control signal has a duty cycle such that said first voltage level has a duration longer than required to energize a solenoid to translate said movable shaft from one of said first and second positions to the other of said first and second positions, and wherein a remaining portion of said first voltage level is coupled to said electrical energy storage device.

* * * * *